United States Patent
Waki et al.

(10) Patent No.: US 6,219,200 B1
(45) Date of Patent: Apr. 17, 2001

(54) THIN FILM MAGNETIC HEAD WITH AIR BEARING END FACE OF MAGNETIC FILM PROTRUDING BEYOND AIR BEARING END FACE OF SUBSTRATE

(75) Inventors: Yoshiharu Waki, Chigasaki; Masayasu Fujisawa, Kanagawa-ken; Yukihiro Isono, Odawara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/779,250

(22) Filed: Jan. 3, 1997

Related U.S. Application Data

(63) Continuation of application No. 08/266,945, filed on Jun. 27, 1994, now abandoned.

(30) Foreign Application Priority Data

Jun. 29, 1993 (JP) .................................... 5-159176

(51) Int. Cl.[7] .................. G11B 5/31; G11B 5/187
(52) U.S. Cl. ................ 360/126; 360/122; 360/234.7; 360/235.1; 360/235.4
(58) Field of Search ................................ 360/126, 125, 360/122, 103, 234.7, 235.3, 235.4, 235.1

(56) References Cited

U.S. PATENT DOCUMENTS

| | | | |
|---|---|---|---|
| 4,420,780 | * 12/1983 | Deckert ................. | 360/122 |
| 4,636,897 | * 1/1987 | Nakamura et al. ........ | 360/122 |
| 4,789,910 | * 12/1988 | Otsuka et al. .......... | 360/125 |
| 5,080,948 | * 1/1992 | Morita et al. .......... | 360/122 |
| 5,094,896 | * 3/1992 | Morita et al. .......... | 360/103 |
| 5,094,897 | * 3/1992 | Morita et al. .......... | 360/103 |

FOREIGN PATENT DOCUMENTS

| | | | |
|---|---|---|---|
| 0543637 | * 5/1993 | (EP) | 360/103 |
| 63-311615 | * 12/1988 | (JP) | 360/122 |
| 1-037703 | * 2/1989 | (JP) | 360/103 |
| 3-296907 | * 12/1991 | (JP) | 360/122 |
| 4-178910 | 6/1992 | (JP) . | |
| 4-258805 | * 9/1992 | (JP) | 360/122 |
| 4-366408 | * 12/1992 | (JP) | 360/126 |
| 5-342530 | * 12/1993 | (JP) | 360/122 |
| 6-012622 | * 1/1994 | (JP) | 360/122 |
| 6-028651 | * 2/1994 | (JP) | 360/103 |
| 6-084155 | * 3/1994 | (JP) | 360/103 |
| 6-150278 | * 5/1994 | (JP) | 360/103 |

OTHER PUBLICATIONS

Translation of Japanese Publication 04–178910 to Wada et al. entitled "Vertical Thin–Film Magnetic Recording/Reproducing Head and Manufacture Thereof", Jun. 25, 1992.*

Translation of Japanese Publication 04–258805 to Hirata entitled "Magnetic Head", Sep. 14, 1992.*

"Trigger 88–1," published by Kabushiki–Kaisha Nikkan Kōgyō Shinbun–sha, 1988, pp. 50–51 (provided in Japanese).

* cited by examiner

Primary Examiner—Craig A. Renner
(74) Attorney, Agent, or Firm—Mattingly, Stanger & Malur, P.C.

(57) ABSTRACT

A thin-film magnetic head in which the end face of a magnetic film protrudes beyond a substrate within the air bearing surface of the magnetic head. The magnetic film being made of a material containing a metallic element which is lap polished with abrasive grains containing the hydroxide of the metallic element. Because the air bearing surface is constructed according to the above procedure, the bit length of a magnetic disk can be decreased to ensure a higher record density.

8 Claims, 9 Drawing Sheets

FIG. 2A PRIOR ART
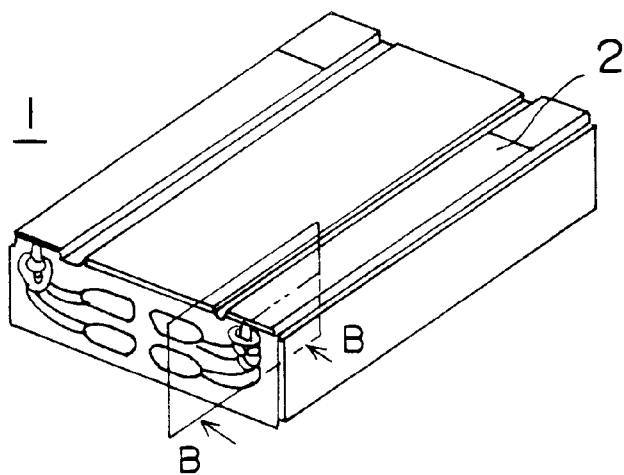
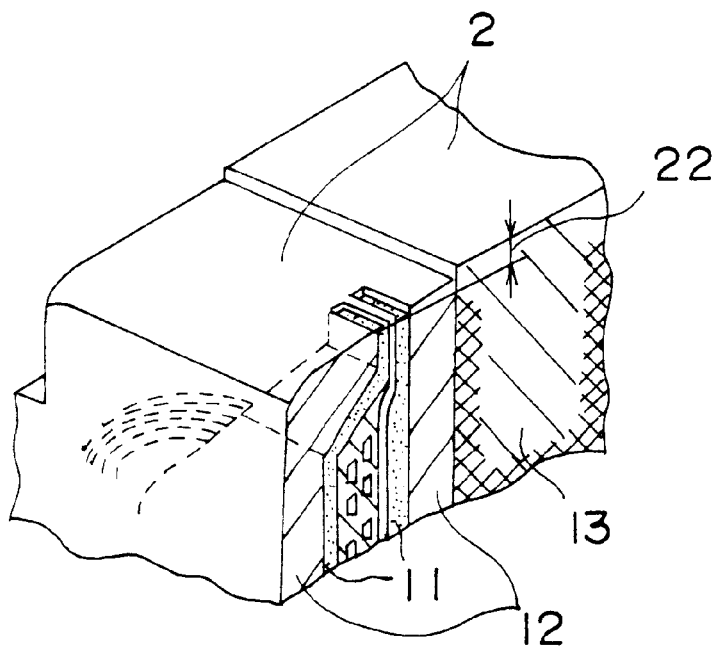
FIG. 2B PRIOR ART

THIN FILM MAGNETIC HEAD WITH AIR BEARING END FACE OF MAGNETIC FILM PROTRUDING BEYOND AIR BEARING END FACE OF SUBSTRATE

This is a continuation of application Ser. No. 08/266,945 filed on Jun. 27, 1994 now abandoned.

BACKGROUND OF THE INVENTION

1. Field of the Invention

The present invention relates to a thin-film magnetic head, and a method of manufacturing the magnetic head. More particularly, it relates to a method of polishing a surface to-be-worked made up of different kinds of materials having unequal hardness values, such as the air bearing surface or floating surface of a thin-film magnetic head. Especially, it relates to a method of manufacturing a thin-film magnetic head so as to be able to protrude the end face of a magnetic film beyond the air bearing surface of the head.

2. Description of the Related Art

In recent years, as an expedient for enhancing the record density of a magnetic record medium in a magnetic recording/reproducing system, research has been carried out on the approach of a magnetic head to the magnetic record medium. FIG. 3 illustrates the positional relationship between the magnetic head and the magnetic record medium in the magnetic recording/reproducing system in the prior art. As clearly shown in FIG. 3, the air bearing surface 2 of the thin-film magnetic head 1 is afloat above the magnetic record medium 21 by a certain flying height 29. In this regard, it has been known that a recorded bit length on the magnetic record medium 21 is in a proportional relationship with the flying height 29 of the magnetic head 1 as illustrated in FIG. 4. In the case of FIG. 4 mentioned by way of example, the bit length increases 0.05 [$\mu$m] as the flying height 29 increases 0.01 [$\mu$m]. For the increase of the record density, therefore, it is desired to decrease the flying height 29 of the magnetic head 1 as much as possible.

Meanwhile, the thin-film magnetic head 1 includes a protective film 12 and a magnetic film 11 which are stacked on a substrate 13 as illustrated in FIGS. 2A and 2B and FIG. 3. The air bearing surface 2 of the magnetic head 1 is formed by so-called "lapping". Lapping is a method wherein, while a lapping fluid which contains diamond abrasive grains is being dropped onto a lap (lapping plate) made of a soft metal, the workpiece (the magnetic head 1 as a semi-finished product) held in position by a holder is slid under pressure so as to polish and form the air bearing surface 2 of the magnetic head 1. The lapping method is stated in, for example, "TRIGGER 88-1 (1988)" published by Kabushiki-Kaisha Nikkan Kōgyō Shinbun-sha, p. 51.

Besides, as disclosed in the official gazette of Japanese Patent Application Laid-open No. 178910/1992, there has been proposed a method wherein the air bearing surface of a thin-film magnetic head is formed so as to protrude a magnetic film beyond this air bearing surface by so-called "float polishing" which polishes the workpiece (the magnetic head as a semi-finished product) without pressing abrasive grains against the workpiece.

All of the prior-art techniques, however, have been problematic as stated below.

When the surface of the workpiece made up of the plurality of members or constituents of the substrate 13, protective film 12 and magnetic film 11 having hardness values unequal to one another, such as the air bearing surface 2 of the thin-film magnetic head 1, is polished by the conventional lapping method utilizing the diamond abrasive grains, there arises the problem that a pole tip recession 22 appears in the worked or finished surface as shown in FIG. 2B and FIG. 3.

The appearance of the pole tip recession 22 is attributed to the fact that, while the workpiece made up of the plurality of members having the unequal hardness values is subject to the finish working under an identical lapping pressure, the intrusional depths of the abrasive grains (namely, the amounts to which the abrasive grains bite into the members) become different due to the differences of the hardness values of the materials of the individual members. Generally in the thin-film magnetic head, the material of the magnetic film (11 in FIG. 2B or FIG. 3) is softer than those of the protective film (12) and substrate (13). By way of example, the thin-film magnetic head 1 in the prior art is constructed of the magnetic film 11 whose Vickers' hardness number is about 200 [kgf/mm$^2$], and the protective film 12 and substrate 13 whose Vickers' hardness numbers are 1300 [kgf/mm$^2$] or above. In this magnetic head 1, the pole tip recession 22 having appeared between the magnetic film 11 and the substrate 13 is in the order of 0.03 [$\mu$m].

As seen from FIG. 3, when such a pole tip recession 22 exists, the magnetic film 11 cannot approach the record medium 21 in correspondence with the recession 22, and hence, the flying height 29 of the thin-film magnetic head 1 cannot be, in effect, reduced. More specifically, in the example mentioned in FIG. 4, when the pole tip recession of 0.03 [$\mu$m] exists in the air bearing surface of the magnetic head, the bit length becomes 0.15 [$\mu$m] greater than in the nonexistence of this recession, and the record density of the magnetic record medium (21 in FIG. 3) is lowered correspondingly.

On the other hand, according to the float polishing method as disclosed in the official gazette of Japanese Patent Application Laid-open No. 178910/1992, the magnetic film can be protruded beyond the air bearing surface, whereby the flying height of the magnetic head can be decreased. Since, however, the float polishing method does not press the abrasive grains against the surface to-be-worked or workpiece, it has the problems of a low abrasion working rate and a low production efficiency. Moreover, the float polishing method features that the edges of the air bearing surface are worked more efficiently. This leads to the problem that the edges of the air bearing surface of the magnetic head are abrasively rounded, so that it is difficult to form a protective film of carbon, silicon or the like at a uniform thickness on the air bearing surface.

SUMMARY OF THE INVENTION

The present invention has for its first object to provide a method of efficiently manufacturing a thin-film magnetic head in which the end face of a magnetic film lies even with, or projects beyond, that of a substrate within the air bearing surface of the magnetic head.

Further, the present invention has for its second object to provide a method of polishing a surface made up of a plurality of members of unequal hardness values, without recessing a surface part which corresponds to the member of lower hardness.

The inventors studied the mechanisms of the working processes of individual members of unequal hardness values during a lapping operation, and have attained to the present invention.

When the plurality of members to-be-worked exhibiting unequal hardness values are lapped with a predetermined lapping force (a force with which the lap or the lapping plate is pressed), the intrusional depths of abrasive grains become different in the respective members to-be-worked, and the abrasion working rates of the respective members are different. On the other hand, when any of the members are lapped with various lapping forces, the lapping forces and the abrasion working rates of the member are in a substantially proportional relationship.

Nevertheless, in the case of lapping the surface of a workpiece which is constructed of the plurality of members of unequal hardness values, the lapping force cannot be changed for the respective members, and the intrusional depths of the abrasive grains become different in the respective members, so that pole tip recessions appear.

Meanwhile, it is known that chip or removal material made by lapping are not made of the material of the workpiece itself intruded and scratched by the abrasive grains, but that a hydroxide is flushed as the chip due to a chemical reaction in which the surface of the piece to-be-lapped is turned into the hydroxide, as illustrated in FIG. 5.

The inventors have discovered out that, using the hydroxide of the workpiece as abrasive grains, the reaction of producing the chip of the hydroxide that takes place at the surface of the workpiece can be suppressed to consequently suppress the flushing of the chip. The suppression of the flushing of the chip makes it possible to render the pole tip recession which has heretofore appeared in the lapping operation utilizing the diamond abrasive grains smaller, and further to protrude the part which has heretofore become recessed.

More specifically, in order to accomplish the first object, according to the present invention, a method of manufacturing a thin-film magnetic head having a substrate, and a magnetic film which is formed of a material containing a metallic element (M), is characterized by comprising the step of forming the magnetic film on the substrate out of the material which contains the metallic element (M); and the step of polishing end faces of said substrate and said magnetic film with abrasive grains which contain a hydroxide of said metallic element (M), thereby forming an air bearing surface of the magnetic head.

Besides, in order to accomplish the second object, according to the present invention, a method of polishing a composite piece constituted by at least two materials of unequal hardness values, is characterized by comprising the step of polishing the composite piece with abrasive grains which contain a hydroxide of a metallic element contained in the material of lower hardness in the constituent materials.

BRIEF DESCRIPTION OF THE DRAWINGS

FIG. 1A is a perspective view showing a thin-film magnetic head in an embodiment of the present invention, while

FIG. 2A is a perspective view showing a thin-film magnetic head in the prior art, while FIG. 2B is a partial sectional view taken along plane B—B indicated in FIG. 2A;

FIGS. 8A thru 8C are schematic views for explaining recessions (i.e., working steps) in the lapping operations of comparative examples, respectively, while

DETAILED DESCRIPTION OF THE INVENTION (Principles of the Invention)

Figure 5:
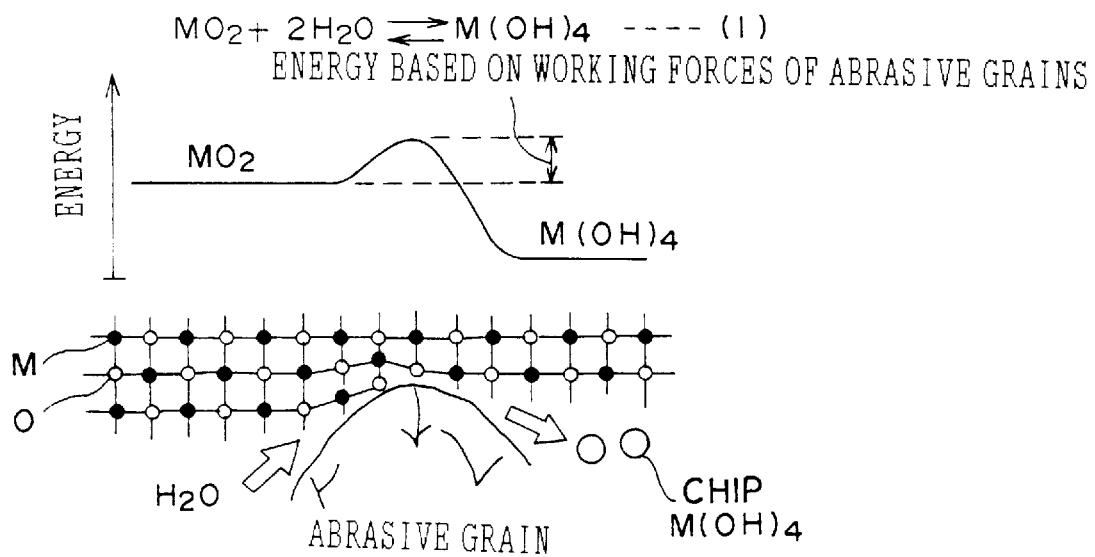
FIG. 5 is a diagram for explaining the flushing of chip during a lapping operation according to the present invention.

The principles of the present invention shall be explained with reference to FIGS. 5, 6 and 7 before the embodiments thereof are described.

Figure 6:
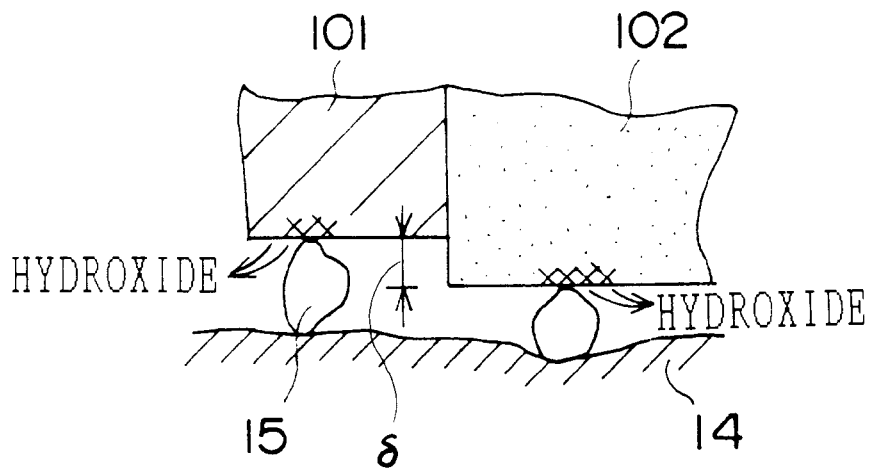
FIG. 6 is a fragmentary sectional view for explaining a lapping method in the prior art that employs diamond abrasive grains.

As illustrated in FIG. 6, when a composite piece made up of materials 101 and 102 of unequal hardness values is lapped with diamond abrasive grains 15 pressed against the piece by a lap (a lapping plate) 14 as in the prior art, the material of lower hardness 101 is worked or polished more effectively than the other material 102. Consequently, a step (a pole tip recession in the case of a thin-film magnetic head) appears as indicated at symbol δ.

In general, in the lapping of a metal oxide such as the oxide film of a metal surface or a metal oxide such as ceramics, the surface of the metal oxide is activated by the action of a working or polishing force based on abrasive grains. Thus, the activated surface reacts with water contained in a lapping fluid, and a metal hydroxide is produced and then flushed in the form of chip or removal material. This situation is illustrated in FIG. 5. In addition, the chemical reaction formula of the production of the chip is given by the following:

$$MO_2 + 2H_2O \leftrightharpoons M(OH)_4 \qquad (1)$$

Here, letter M denotes the metallic element of the metal hydroxide at the surface of the piece to-be-polished. In the chemical formula (1), a tetravalent metallic element is mentioned by way of example. Besides, the letter O indicates oxygen, and the letter H hydrogen.

Figure 7:
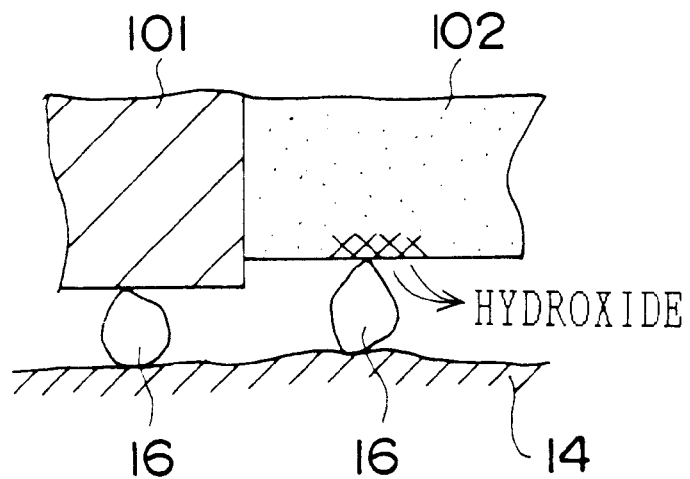
FIG. 7 is a fragmentary sectional view for explaining a lapping method in the present invention that employs a hydroxide for abrasive grains.

In the present invention illustrated in FIG. 7, the hydroxide of a metallic element M contained in a material of lower hardness 101 is employed as abrasive grains 16 for lapping, whereby the concentration of the hydroxide of the metallic element M at the surface of a workpiece (constituted by the material 101 and a material of higher hardness 102) is increased to suppress the chemical reaction in which the chip of the material 101 as the metal hydroxide is produced. More specifically, when the metal oxide $MO_2$ in formula (1) is employed as the lapping abrasive grains 15 by way of example, the concentration of this metal oxide $MO_2$ is high at the interfaces between the abrasive grains 15 and the piece to-be-lapped in FIG. 6, and hence, the reaction of formula (1) proceeds more from the left side to the right side thereof. That is, the metal hydroxide $M(OH)_4$ becomes more liable to be flushed as the chip. To the contrary, when the metal hydroxide $M(OH)_4$ is employed as the lapping abrasive grains 16 supplied onto a lap 14, the concentration of this metal hydroxide $M(OH)_4$ is high at the interfaces between the abrasive grains 16 and the piece to-be-lapped in FIG. 7, and hence, the equilibrium condition of formula (1) tends toward the left side. That is, the metal hydroxide $M(OH)_4$ becomes less liable to be flushed as the chip.

Thus, the flushing of the chip of the material of lower hardness 101 is suppressed, and the step (the pole tip recession in the magnetic head) between the materials 101 and 102 becomes smaller than in the case of the polishing with the diamond abrasive grains. Further, it is permitted to protrude the worked or polished surface of the material 101 beyond that of the material 102 as shown in FIG. 7.

When the method illustrated in FIG. 7 is applied to the manufacture of the thin-film magnetic head, the hydroxide of the metallic element M contained in a magnetic film is employed as the abrasive grains for lapping the air bearing surface of the magnetic head, whereby the end face of the magnetic film can be protruded beyond that of a substrate. It is accordingly possible to manufacture the thin-film magnetic head in which, within the air bearing surface, the pole tip recession is null or the end face of the magnetic film protrudes beyond that of the substrate. In consequence, the flying height of the thin-film magnetic head can be decreased to fabricate a magnetic disk unit or drive which offers a much higher record density than in the prior art.

(Preferred Embodiments of the Invention)

Now, a thin-film magnetic head in an embodiment of the present invention will be described with reference to the accompanying drawings.

Figure 1A:
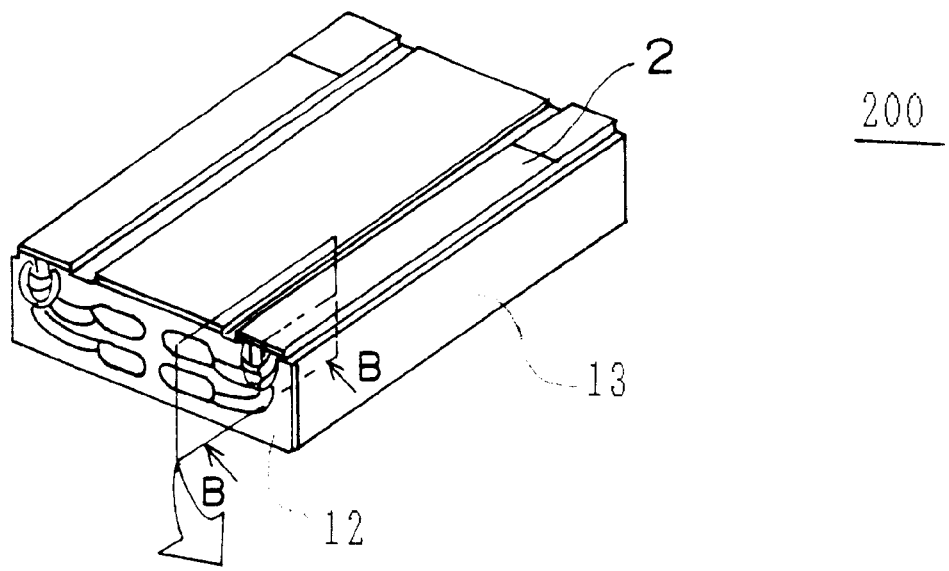
Figure 1B:
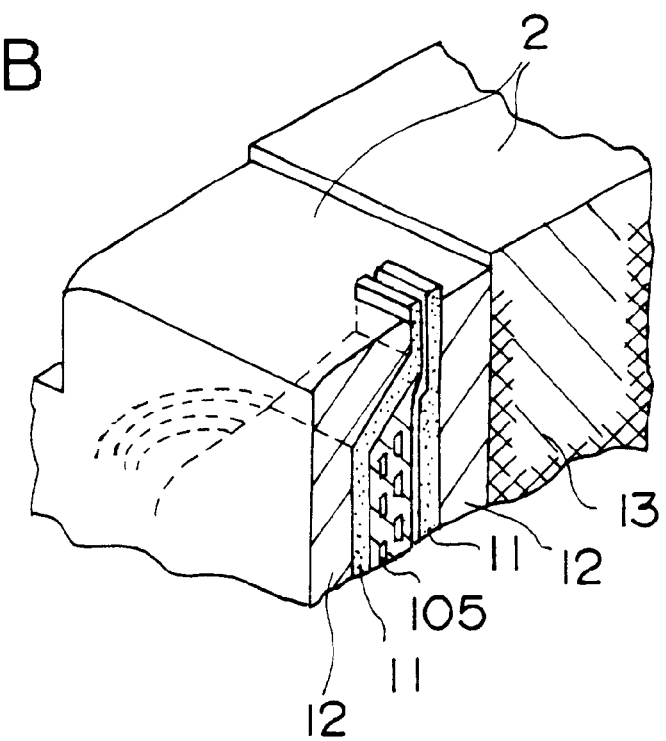
FIG. 1B is a partial sectional view taken along plane B—B indicated in FIG. 1A.
Figure 8A:
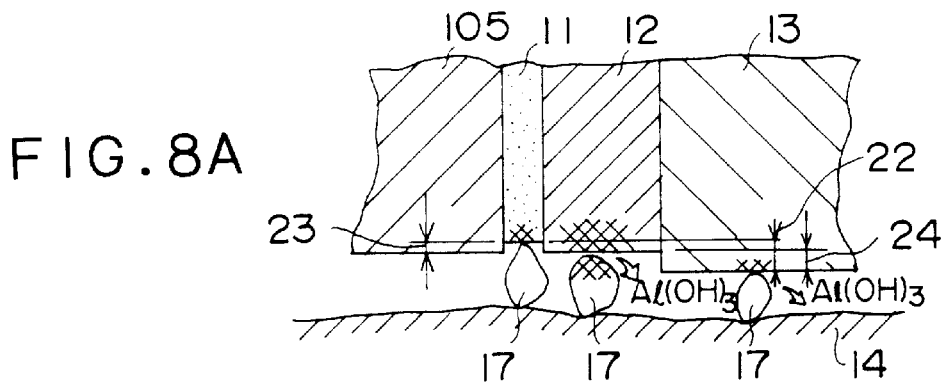
Figure 8B:
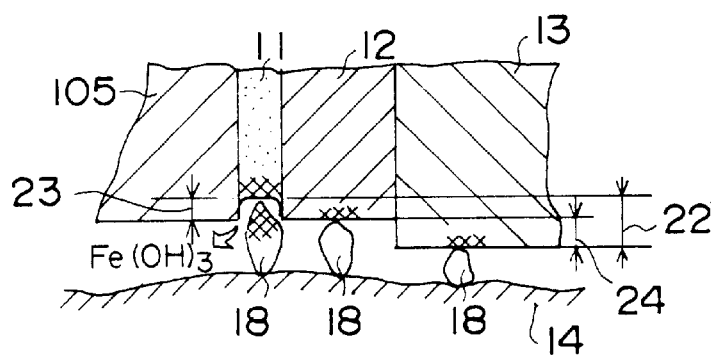
Figure 8C:
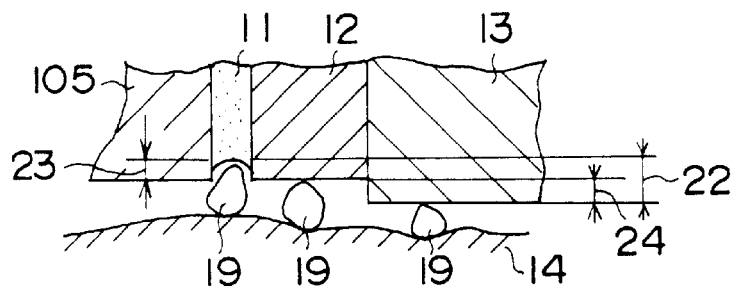
Figure 8D:
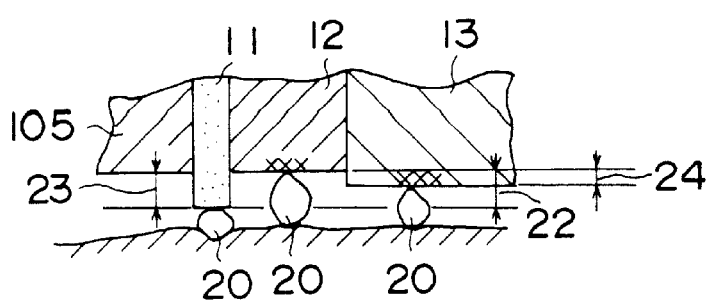
FIG. 8D is a schematic view for explaining recessions in the lapping operation of an embodiment of the present invention.

As shown in FIGS. 1A and 1B, the thin-film magnetic head 200 in this embodiment includes a substrate 13 which is overlaid with a magnetic film 11, a protective film 12 and a thin-film coil 105. An air bearing surface 2 is defined by the end faces of the substrate 13, a magnetic film 11 and a protective film 12. Herein, the end face of the magnetic film 11 is protruded beyond those of the other constituents as shown in FIG. 1B and FIG. 8D. In this embodiment, the magnetic film 11 is made of Permalloy which is an alloy consisting of nickel (Ni) and iron (Fe). Besides, the protective film 12 is made of aluminum oxide ($Al_2O_3$), and the substrate 13 alumina type ceramics. Regarding the Vickers' hardness, the magnetic film 11 has a value of about 200 [$kgf/mm^2$], while the protective film 12 and the substrate 13 have values of 1300 [$kgf/mm^2$] or above. Accordingly, the magnetic film 11 is softer than the substrate 13.

Next, a method of manufacturing the thin-film magnetic head 200 in an embodiment of the present invention will be described.

First, the protective film 12, magnetic film 11 and thin-film coil 105 are formed on the substrate 13. Subsequently, the air bearing surface 2 is formed by lapping. In an example of this embodiment, iron hydroxide ($Fe(OH)_3$) was used as abrasive grains 20 as shown in FIG. 8D. Besides, as comparative examples, workpieces were similarly lapped by employing aluminum oxide ($Al_2O_3$), iron trioxide ($Fe_2O_3$) and aluminum hydroxide ($Al(OH)_3$) for abrasive grains 17, 18 and 19 as shown in FIG. 8A, FIG. 8B and FIG. 8C, respectively. A lapping fluid in each example was prepared in such a way that the abrasive grains weighing 2.0 [g] were dispersed in 1 [l] of ion-exchanged water with a surface-active agent. The average grain diameter of the abrasive grains was set at 10 [$\mu m$]. The material of a lap (a surface plate for lapping) 14 used in each example was tin (Sn), the rotational frequency of the lap 14 was set at 100 [r.p.m.], and a lapping pressure of 6 [$g/mm^2$] was set.

Figure 10:
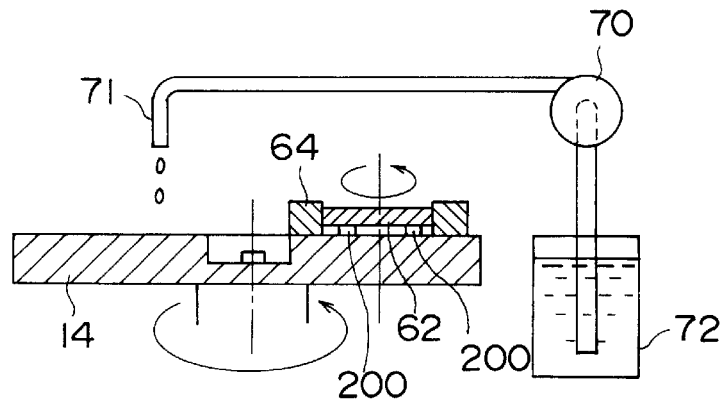
FIG. 10 is a partly-sectional side view showing the construction of a lapping apparatus used in each embodiment of the present invention.

Here, a lapping apparatus which utilizes the abrasive grains explained above will be described with reference to FIG. 10.

The illustrated lapping apparatus includes the lap 14, and a drive unit (not shown) for rotating this lap. It is furnished with a pump 70, a tube 71, and a tank 72 from which the lapping fluid as a working fluid is supplied onto the lap 14 during the lapping operation. A jig 62 serves to hold the workpiece (the magnetic head 200 as a semi-finished product) in position, while a correcting ring 64 serves to prevent the nonuniform defacement of the lap 14.

The magnetic head 200 is held by the jig 62 and then placed on the lap 14. In this state, the lapping fluid stored in the tank 72 is supplied onto the lap 14. As the lap 14 is rotated by the drive unit, the abrasive grains contained in the supplied lapping fluid get in between the lap 14 and the magnetic head 200 to polish the latter.

It is to be understood, however, that the lapping apparatus mentioned here is a mere example, and that any of various apparatuses having other suitable mechanisms can be employed.

Next, the comparative examples and the embodiment will be described in detail.

FIG. 8A is a schematic view illustrative of the lapping of the workpiece (the head 200 as a semi-finished product) in which the abrasive grains 17 are made of aluminum oxide $Al_2O_3$ as the first comparative example. At the interfaces between the abrasive grains 17 of the aluminum oxide $Al_2O_3$ and the material $Al_2O_3$ of the protective film 12 as well as the substrate 13, a reaction indicated by the following chemical formula takes place:

$$Al_2O_3 + 3H_2O \rightleftharpoons 2Al(OH)_3 \qquad (2)$$

Figure 9:
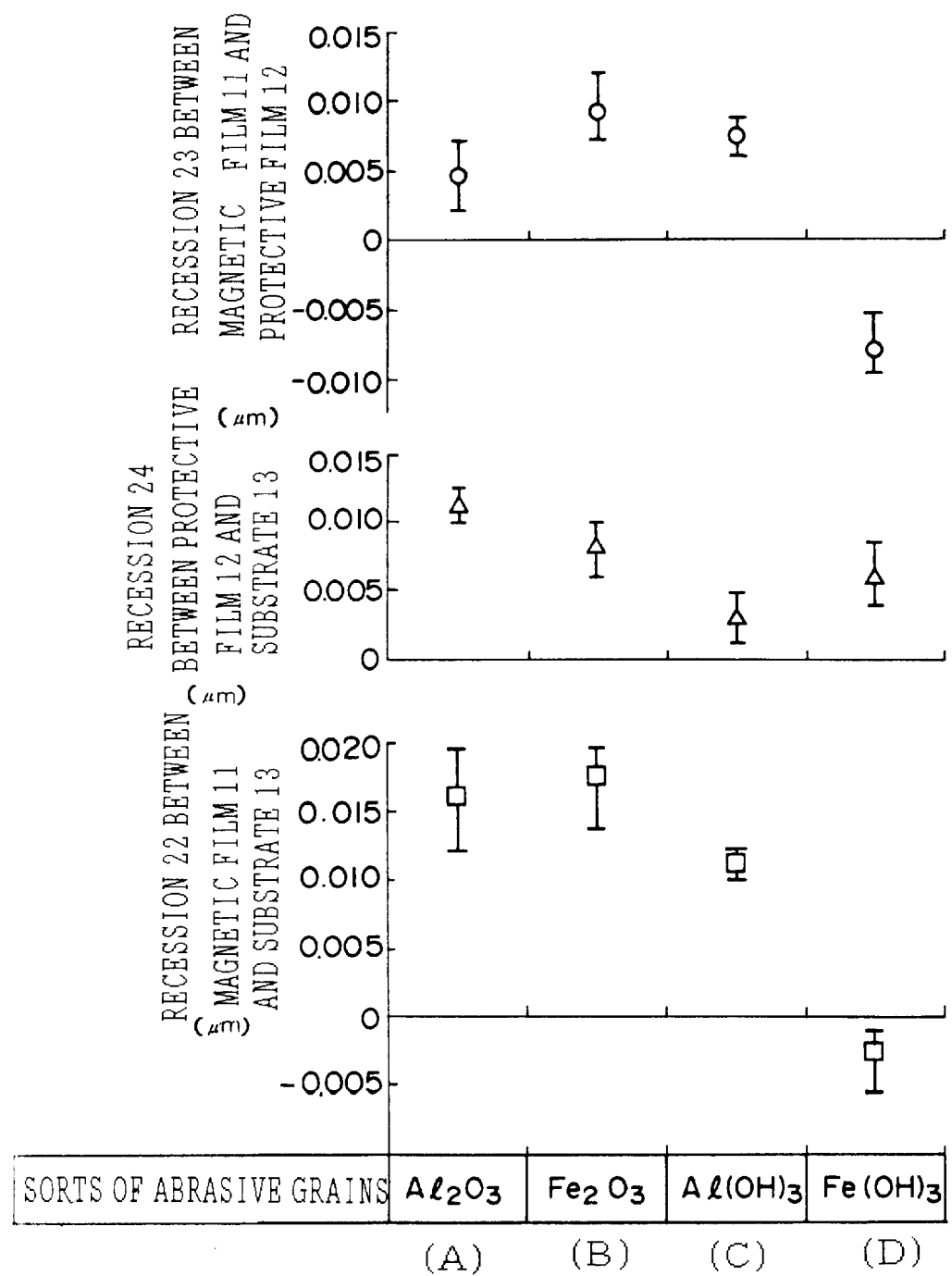
FIG. 9 is a graph showing the differences of the recessions based on the different materials of abrasive grains in the comparative examples and the embodiment shown in FIGS. 8A thru 8D.

At the interfaces between the abrasive grains 17 and the protective film 12 and at the interfaces between the abrasive grains 17 and the substrate 13, the concentration of the aluminum oxide $Al_2O_3$ is high because of the $Al_2O_3$ abrasive grains 17, and hence, the reaction of formula (2) proceeds more from the left side to the right side thereof. That is, aluminum hydroxide $Al(OH)_3$ becomes more liable to be flushed as chip or removal material. In contrast, the reaction as stated above does not take place at the interfaces between the abrasive grains 17 of the aluminum oxide $Al_2O_3$ and the magnetic film 11 of Permalloy. Accordingly, although the protective film 12 is higher in hardness than the magnetic film 11, the working or lapping efficiency of the former 12 increases owing to the use of the aluminum oxide $Al_2O_3$ as the abrasive grains 17, and the recession or step 23 between these films 11 and 12 becomes smaller than in the prior-art case of employing the diamond abrasive grains. In addition, the recession 24 between the protective film 12 and the substrate 13 hardly differs from the corresponding recession in the case of employing the diamond abrasive grains, because the reaction of formula (2) tends toward the right side at the surfaces of both the constituents 12 and 13. Accordingly, the recession 22 between the magnetic film 11 and the substrate 13 becomes somewhat smaller than in the case of employing the diamond abrasive grains. The results concerning the recessions 23, 24 and 22 are indicated at a column (A) in FIG. 9.

FIG. 8B is a schematic view illustrative of the lapping of the workpiece (the head 200 as a semi-finished product) in which the abrasive grains 18 are made of iron trioxide $Fe_2O_3$ as the second comparative example. At the interfaces between the abrasive grains 18 of the iron trioxide $Fe_2O_3$ and an oxide film of the iron trioxide $Fe_2O_3$ attributed to the oxidation of the surface of the magnetic film 11, a reaction indicated by the following chemical formula takes place:

$$Fe_2O_3+3H_2O \rightleftharpoons 2Fe(OH)_3 \tag{3}$$

At the interfaces between the abrasive grains 18 and the magnetic film 11, the concentration of the iron trioxide $Fe_2O_3$ is high, and hence, the reaction of formula (3) proceeds more from the left side to the right side thereof. That is, iron hydroxide $Fe(OH)_3$ becomes more liable to be flushed as chip. In contrast, the reaction as stated above does not take place at the interfaces between the abrasive grains 18 of the iron trioxide $Fe_2O_3$ and the material $Al_2O_3$ of the protective film 12. It does not take place at the interfaces between the abrasive grains 18 and the substrate 13, either. The magnetic film 11 is lower in hardness than the protective film 12 and the substrate 13, and the working efficiency thereof further increases because of the tendency of the reaction toward the right side, so that the recessions 23 and 24 become larger than in the case of employing the diamond abrasive grains. Accordingly, the recession 22 between the magnetic film 11 and the substrate 13 becomes larger than in the case of employing the diamond abrasive grains. The results concerning the recessions 23, 24 and 22 are indicated at a column (B) in FIG. 9.

FIG. 8C is a schematic view illustrative of the lapping of the workpiece in which the abrasive grains 19 are made of aluminum hydroxide $Al(OH)_3$ as the third comparative example.

The reaction of the chemical formula (2) mentioned before takes place at the interfaces between the abrasive grains 19 of the aluminum hydroxide $Al(OH)_3$ and the material $Al_2O_3$ of the protective film 12 as well as the substrate 13. In this example, however, the concentration of the aluminum hydroxide $Al(OH)_3$ is high at the interfaces because of the $Al(OH)_3$ abrasive grains 19, and hence, the reaction of formula (2) proceeds more from the right side to the left side. That is, the aluminum hydroxide $Al(OH)_3$ becomes less liable to be flushed as chip at the interfaces between the abrasive grains 19 and the protective film 12 as well as the substrate 13, and the working efficiency of the protective film 12 as well as the substrate 13 is lowered. On the other hand, the reaction as stated above does not take place at the interfaces between the abrasive grains 19 of the aluminum hydroxide $Al(OH)_3$ and an oxide film of iron trioxide $Fe_2O_3$ attributed to the oxidation of the surface of the magnetic film 11. Accordingly, the recession 23 between the magnetic film 11 and the protective film 12 becomes smaller than in the case of employing the diamond abrasive grains. Also, the recession 24 between the protective film 12 and the substrate 13 becomes smaller than in the case of employing the diamond abrasive grains. Consequently, the recession 22 between the magnetic film 11 and the substrate 13 becomes smaller than in the case of employing the diamond abrasive grains. The results concerning the recessions 23, 24 and 22 are indicated at a column (C) in FIG. 9.

FIG. 8D is a schematic view illustrative of the lapping of the workpiece in which the abrasive grains 20 are made of iron hydroxide $Fe(OH)_3$ as the embodiment of the present invention.

The reaction of the chemical formula (3) mentioned before takes place at the interfaces between the abrasive grains 20 of the iron hydroxide $Fe(OH)_3$ and an oxide film of iron trioxide $Fe_2O_3$ attributed to the oxidation of the surface of the magnetic film 11. In this embodiment, however, the concentration of the iron hydroxide $Fe(OH)_3$ is high at the interfaces because of the $Fe(OH)_3$ abrasive grains 20, and hence, the reaction of formula (3) proceeds more from the right side to the left side. That is, the iron hydroxide $Fe(OH)_3$ becomes less liable to be flushed as chip, and the working efficiency of the magnetic film 11 is lowered. On the other hand, the reaction as stated above does not take place at the interfaces between the abrasive grains 20 and the protective film 12 as well as the substrate 13. Accordingly, notwithstanding that the magnetic film 11 is softer than the protective film 12 as well as the substrate 13, the working efficiency of the former 11 based on the abrasive grains 20 becomes lower than that of the latter 12 as well as 13. Thus, the worked or lapped surface of the magnetic film 11 protrudes beyond that of the protective film 12 as well as the substrate 13. Besides, the recession 24 between the protective film 12 and the substrate 13 does not differ from the corresponding recession in the case of employing the diamond abrasive grains. The results concerning such positional relationships are indicated at a column (D) in FIG. 9.

As stated above, in this embodiment, the air bearing surface (2 in FIGS. 1A and 1B) of the thin-film magnetic head (200) is formed by lapping the end faces of the members 11, 12 and 13 under the condition that the hydroxide of iron Fe being the constituent element of the magnetic film 11 is used as the abrasive grains 20 in order to suppress the hydroxidation of the magnetic film 11. Thus, it is possible to manufacture the magnetic head 200 having that configuration shown in FIG. 1B in which the magnetic film 11 of the lower hardness is protruded beyond the protective film 12 and substrate 13 of the higher hardness within the air bearing surface 2.

Figure 11:
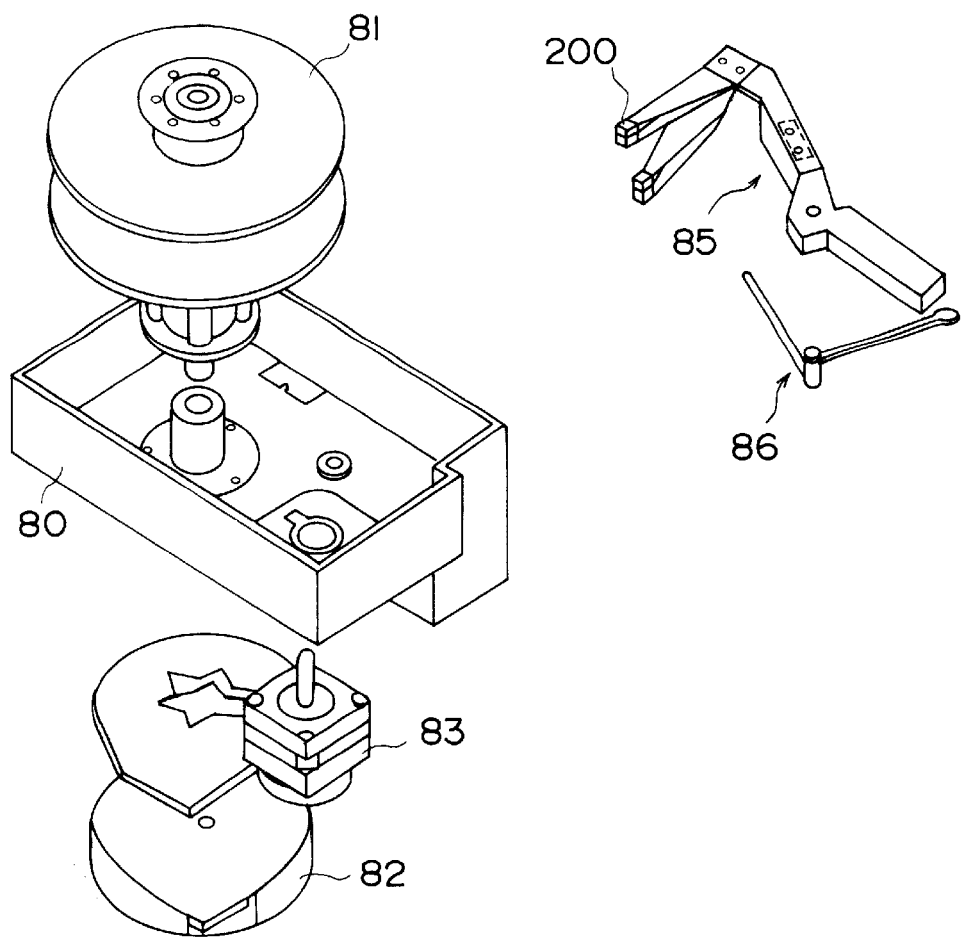
FIG. 11 is an exploded perspective view showing the construction of a magnetic disk unit according to the present invention.

Here, a magnetic disk unit or drive which employs the magnetic head 200 lapped by utilizing the abrasive grains 20 will be described below with reference to FIG. 11.

The illustrated magnetic disk unit includes a magnetic disk 81 which is rotatably housed in a casing 80, and a spindle motor 82 which is adapted to rotate the magnetic disk 81. The magnetic head 200 for reading information recorded on the magnetic disk 81 is held by a swing arm 85, a steel band 86, etc. It is designed to be movable along the information recording surface of the magnetic disk 81 by a stepper motor 83. These elements are controlled in motion by a control circuit not shown.

Although the magnetic disk unit mentioned here is incapable of exchanging the prescribed magnetic disk 81, it may well be arranged so that the magnetic disk 81 can be exchanged as desired by the user of the unit. It is also possible to employ other mechanisms than the example shown in FIG. 11.

Figure 3:
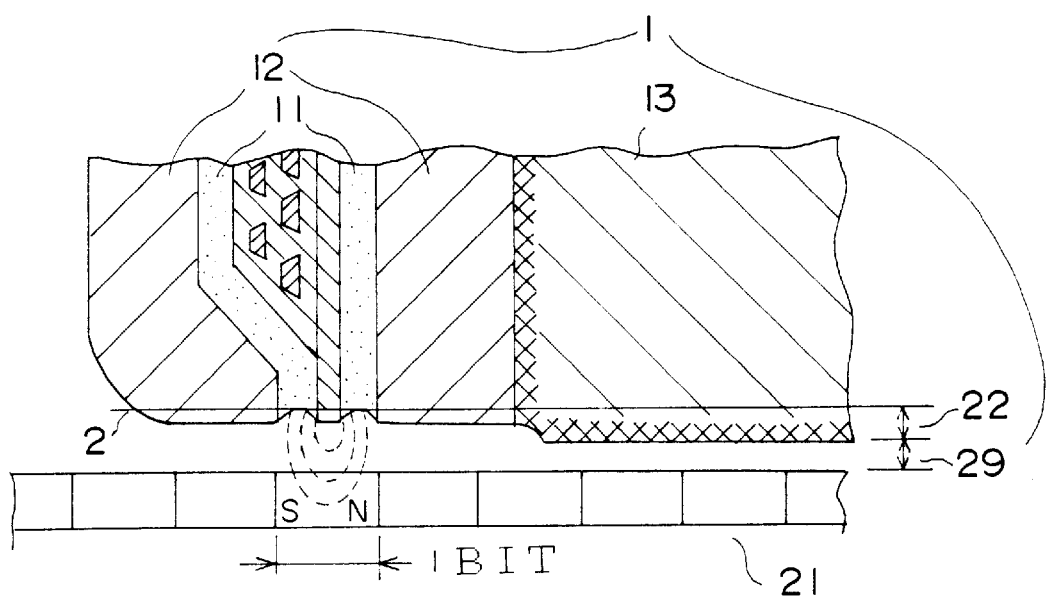
FIG. 3 is a schematic view for explaining the positional relationship between the prior-art thin-film magnetic head and a magnetic record medium.
Figure 4:
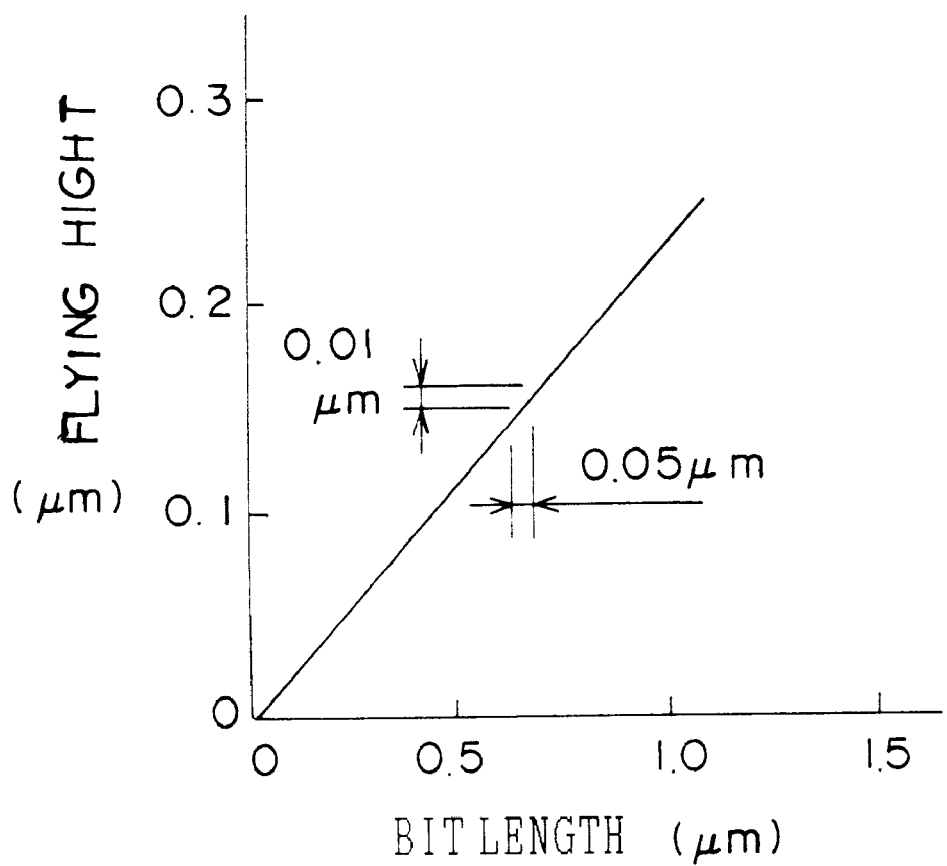
FIG. 4 is a graph showing the relationship between the flying height of the thin-film magnetic head and a bit length recorded in the magnetic record medium.

With the magnetic head 200 of this embodiment in which the magnetic film 11 is protruded beyond the air bearing surface 2, the end face of the magnetic film 11 can be approached to the magnetic disk 81 without being hindered by the pole tip recession. Accordingly, the flying height of the magnetic head 200 can be decreased to enhance the record density of the magnetic disk 81. By way of example, the pole tip recession of 0.03 [$\mu$m] appears between the magnetic film (11 in FIG. 3) and the substrate (13) in the prior-art case of employing the diamond abrasive grains. According to this embodiment, the pole tip recession can be rendered null, and further, the magnetic film 11 can be protruded beyond the protective film 12 and substrate 13. In this way, the limit value of the recorded bit length of the magnetic disk can be decreased to, at least, 0.15 [$\mu$m].

Moreover, according to this embodiment, the air bearing surface is formed using the lapping method in which the workpiece is polished with the abrasive grains pressed against the surface to-be-worked by the lap. When compared with any other working method such as float polishing or etching, therefore, the method of this embodiment exhibits a higher working efficiency and can enhance the production efficiency of the thin-film magnetic head. Meanwhile, the surface roughness values of the air bearing surface of the thin-film magnetic head manufactured by this embodiment are 4.5~10.0 [nm] in terms of the maximum height ($R_{max}$), 0.5~2.0 [nm] in terms of the centerline average height ($R_a$), and 2.0~8.0 [nm] in terms of the ten-point average height ($R_z$). Although these roughness values are greater than the surface roughness values of the air bearing surface formed by float polishing or etching, they do not affect the air bearing or floating characteristics and record/reproduction characteristics of the thin-film magnetic head. In addition, since the thin-film magnetic head of this embodiment is worked by lapping, sagging (or rounding) does not develop at the edges of the air bearing surface, and a uniform protective film can be further formed on the air bearing surface by the use of silicon, carbon or the like. Besides, the example of lapping the air bearing surface of the thin-film magnetic head has been referred to in this embodiment. However, the present invention is not restricted to the thin-film magnetic head, but it is suitable for the lapping of any composite piece constituted by metals or/and metal oxides. Even when the composite piece includes a part of low hardness, the method of the present invention can relieve a working step ascribable to a recession having hitherto appeared at the part, and it can cause the part to protrude contrariwise. By way of example, when applied to the polishing of the end faces of a multilayer wiring circuit board in which ceramics substrates and wiring layers are stacked in multilayer fashion, the method of the present invention can cause the end faces of the wiring layers to protrude beyond those of the ceramics substrates.

Although the simple substance of the metal hydroxide is used as the abrasive grains in the embodiment shown in FIG. 8D, the abrasive grains of the metal hydroxide and those of diamond can also be mixed and used. Thus, the working efficiency of the lapping can be regulated.

As described above, according to the present invention, the hydroxide of a metal is employed as abrasive grains for lapping, whereby in polishing a composite piece constituted by a plurality of materials of unequal hardness values, a part of lower hardness in the piece can be prevented from becoming recessed and can be further made to protrude contrariwise. When the air bearing surface of a thin-film magnetic head is formed using such a method, the end face of a magnetic film can be rendered even with, or protruded beyond, that of a substrate, and the flying height of the thin-film magnetic head can be decreased.

What is claimed is:

1. A thin-film magnetic head for magnetically reading information, having a substrate and a first magnetic film portion on said substrate, a thin film coil on said first magnetic film portion and a second magnetic film portion on said thin film coil, said thin film coil being between said first and second magnetic film portions wherein an air bearing surface is defined by end faces of the substrate and the magnetic film portions; wherein, the entire end face of said magnetic film portions lies at a level which protrudes beyond the end face said substrate, within the air bearing surface; and said substrate is made of alumina type ceramics.

2. A magnetic disk unit having holding means for holding a magnetic disk, drive means for driving and rotating the magnetic disk, and a thin-film magnetic head for magnetically reading information;

wherein said thin-film magnetic head includes a substrate, and a first magnetic film portion on said substrate, a thin film coil on said first magnetic film portion and a second magnetic film portion on said thin film coil, said thin film coil being between said first and second magnetic film portions, an air bearing surface being defined by end faces of said substrate and said magnetic film portions;

the entire end face of said magnetic film portions lies at a level which protrudes beyond the end face of said substrate, within the air bearing surface; and said substrate is made of alumina type ceramics.

3. A thin-film magnetic head for magnetically reading information, having a substrate and a first magnetic film portion on said substrate, a thin film coil on said first magnetic film portion and a second magnetic film portion on said thin film coil, said thin film coil being between said first and second magnetic film portions, wherein an air bearing surface is defined by end faces of the substrate and the magnetic film portions; wherein, the entire end face of said magnetic film portions lies at a level which protrudes beyond the end face of said substrate, within the air bearing surface;

the end faces of said substrate and said magnetic film portions exhibit a roughness of at least 4.5 nm in terms of a maximum height (Rmax); and said substrate is made of alumina type ceramics.

4. The thin-film magnetic head of claim 3 prepared by the process comprising:

forming the magnetic film portions of a material which contains iron (Fe) on the substrate; and polishing the end faces of said substrate and said magnetic film portions with abrasive grains which contain iron hydroxide ($Fe(OH)_3$).

5. The thin-film magnetic head of claim 3 wherein at least one of the substrate and the magnetic film portions contain a metallic element, said thin-film magnetic head being prepared by the process comprising, the step of forming the magnetic film portions on the substrate and the step of polishing the end faces of the substrate and the magnetic film portions with abrasive grains which contain a hydroxide of said metallic element.

6. The thin-film magnetic head of claim 3, further comprising a protective film;

at least one of the substrate, the magnetic film portions and said protective film containing a metallic element;

said thin-film magnetic head being prepared by the process comprising:

the step of forming the magnetic film portions and the protective film on the substrate in this order; and the step of polishing said end faces of the substrate and the magnetic film portions and also the protective film with abrasive grains which contain a hydroxide of said metallic element.

7. The thin-film magnetic head of claim 3 prepared by the process comprising:

the step of forming the magnetic film portions on the substrate out of a material which contains a metallic element (M); and the step of polishing the end faces of said substrate and said magnetic film portions with abrasive grains which contain a hydroxide of said metallic element (M), thereby forming said air bearing surface of the magnetic head.

8. A magnetic disk unit having holding means for holding a magnetic disk, drive means for driving and rotating the magnetic disk, and a thin-film magnetic head for magnetically reading information;

wherein said thin-film magnetic head includes a substrate, and a first magnetic film portion on said substrate, a thin film coil on said first magnetic film portion and a second magnetic film portion on said thin film coil, said thin film coil being between said first and second magnetic film portions, an air bearing surface being defined by end faces of said substrate and said magnetic film portions;

the entire end face of said magnetic film portions lies at a level which protrudes beyond the end face of said substrate, within the air bearing surface;

the end faces of said substrate and said magnetic film portions exhibit a roughness of at least 4.5 nm in terms of a maximum height (Rmax); and said substrate is made of alumina type ceramics.

* * * * *